United States Patent
Rozas et al.

(10) Patent No.: US 10,234,893 B2
(45) Date of Patent: Mar. 19, 2019

(54) DUAL-DOMAIN DYNAMIC MULTIPLEXER AND METHOD OF TRANSITIONING BETWEEN ASYNCHRONOUS VOLTAGE AND FREQUENCY DOMAINS

(71) Applicant: Nvidia Corporation, Santa Clara, CA (US)

(72) Inventors: Guillermo J Rozas, Santa Clara, CA (US); Jason Golbus, Santa Clara, CA (US); Chi Keung Lee, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 1014 days.

(21) Appl. No.: 13/892,931

(22) Filed: May 13, 2013

(65) Prior Publication Data
US 2014/0337659 A1 Nov. 13, 2014

(51) Int. Cl.
*G06F 1/12* (2006.01)

(52) U.S. Cl.
CPC ..................................... *G06F 1/12* (2013.01)

(58) Field of Classification Search
CPC ..... G11C 11/41; G11C 11/412; G11C 11/413; G11C 11/417; G11C 11/418; G11C 11/419; G11C 8/10; G11C 8/16; G11C 7/1075
See application file for complete search history.

(56) References Cited

U.S. PATENT DOCUMENTS

| | | | | |
|---|---|---|---|---|
| 5,481,495 A * | 1/1996 | Henkels | ................... | G11C 8/16 365/189.02 |
| 5,543,731 A * | 8/1996 | Sigal | ................ | H03K 3/356026 326/40 |
| 5,590,354 A * | 12/1996 | Klapproth | ........ | G01R 31/31705 714/30 |
| 5,636,176 A * | 6/1997 | Hashimoto | ............ | G09G 5/391 365/221 |
| 6,087,855 A * | 7/2000 | Frederick, Jr. | ..... | H03K 19/0963 326/105 |
| 6,263,390 B1 * | 7/2001 | Alasti | ................. | G06F 13/4059 710/1 |
| 6,549,060 B1 * | 4/2003 | Mellinger | ............ | H03K 17/693 327/200 |
| 6,553,448 B1 * | 4/2003 | Mannion | ................... | G06F 5/10 341/98 |
| 6,757,854 B1 * | 6/2004 | Zhao | .................... | G11C 29/003 714/719 |
| 6,986,004 B1 * | 1/2006 | Cheng | ................ | H03K 19/1737 711/101 |

(Continued)

*Primary Examiner* — J. H. Hur
(74) *Attorney, Agent, or Firm* — Richard Calderwood; Parker Justiss, P.C.

(57) ABSTRACT

A dual-domain dynamic multiplexer and a method of transitioning between asynchronous voltage and frequency domains. One embodiment of the dual-domain dynamic multiplexer includes: (1) a first domain having a first voltage and a first clock, and a second domain having a second voltage and a second clock, (2) a plurality of data and data select input pairs wherein a data input of an input pair is in the first domain and a data select input of an input pair is in the second domain, and (3) a pre-charge stage in the second domain that is energized upon an edge of the second clock, whereby one data and data input pair is enabled and data latched in the second domain upon another edge of the second clock.

6 Claims, 3 Drawing Sheets

(56) References Cited

U.S. PATENT DOCUMENTS

| | | | |
|---|---|---|---|
| 2005/0018519 A1* | 1/2005 | Nii | G11C 11/417 365/227 |
| 2006/0097766 A1* | 5/2006 | Dhong | H03K 3/356113 327/199 |
| 2007/0279966 A1* | 12/2007 | Houston | G11C 11/412 365/154 |
| 2008/0008021 A1* | 1/2008 | Sarwary | G06F 17/5022 365/221 |
| 2009/0189675 A1* | 7/2009 | Chan | H03K 17/693 327/409 |
| 2012/0151243 A1* | 6/2012 | Ono | G06F 5/12 713/400 |
| 2012/0307578 A1* | 12/2012 | Noguchi | G11C 29/802 365/200 |
| 2013/0182515 A1* | 7/2013 | Lin | G06F 5/10 365/189.15 |

\* cited by examiner

DUAL-DOMAIN DYNAMIC MULTIPLEXER AND METHOD OF TRANSITIONING BETWEEN ASYNCHRONOUS VOLTAGE AND FREQUENCY DOMAINS

TECHNICAL FIELD

This application is directed, in general, to asynchronous first-in, first-out (FIFO) memory and, more specifically, to transitioning between voltage and frequency domains during read and write cycles to asynchronous FIFO memory.

BACKGROUND

First-in, first-out (FIFO) memory is used in buffering applications between devices operating at different clock speeds or in flow control applications where data is stored temporarily for further processing. When using FIFO memory, the first data written to the memory is the first data released. In this fashion, FIFO memory achieves its buffering and flow control functions. A common use of FIFO memory is between two communication busses either clocked at different frequencies or having asynchronous clocks. FIFO memory is also common in inter-processor communication, where two processors are clocked at different frequencies.

Many types of FIFO memory chips are commercially available and in use in the computing industry. Chips vary in their density, capacity, supply voltage, operating temperature and interface details, among many other properties. FIFO memory can be implemented in a variety of memory types, including: random access memory (RAM), which includes dynamic RAM (DRAM), static RAM (SRAM) and many other variations, flip-flops, latches or any other suitable form of storage. One significant distinction among FIFO memory implementations is whether an implementation communicates synchronously or asynchronously. In synchronous FIFO memory, read and write cycles use the same clock for their operations. Synchronous FIFO memory is well suited for high-performance systems, clocked at high speeds. In asynchronous FIFO memory, read and write cycles use different clocks, which introduces metastability issues. Metastable events are when a logic device is neither at logic high or logic low, but at an indeterminate level. This leads to data errors. To mitigate the risk of metastability in asynchronous FIFO memory, designers typically take steps to synchronize read and write clocks, or synchronize read and write pointers to the read and write clocks.

SUMMARY

One aspect provides a dynamic multiplexer. In one embodiment, the multiplexer includes: (1) a first domain having a first voltage and a first clock, and a second domain having a second voltage and a second clock, (2) a plurality of data and data select input pairs wherein a data input of an input pair is in the first domain and a data select input of an input pair is in the second domain, and (3) a pre-charge stage in the second domain that is energized upon an edge of the second clock, whereby one data and data input pair is enabled and data latched in the second domain upon another edge of the second clock.

Another aspect provides a method of transitioning between two asynchronous voltage-frequency domains. In one embodiment, the method includes: (1) pre-charging a readline to a read voltage, (2) coupling the readline to an asynchronous data line charged to a write voltage, (3) disabling the pre-charging, and (4) capturing data from the asynchronous data line in a latch charged at the read voltage upon an edge of a read clock.

Yet another aspect provides a dual-domain memory spanning a write domain and a read domain. In one embodiment, the memory includes: (1) a static random access memory (SRAM) cell having a storage node by which values are writable and readable, (2) a write word line electrically couplable to a write voltage source and operable to cause the SRAM cell to latch a value applied to a write bit line electrically coupled to the storage node, and (3) a read word line electrically couplable to a read voltage source and operable to cause the SRAM cell to apply a latched value to a read bit line for use in additional circuitry in the read domain.

BRIEF DESCRIPTION

Reference is now made to the following descriptions taken in conjunction with the accompanying drawings, in which.

DETAILED DESCRIPTION

Figure 1:
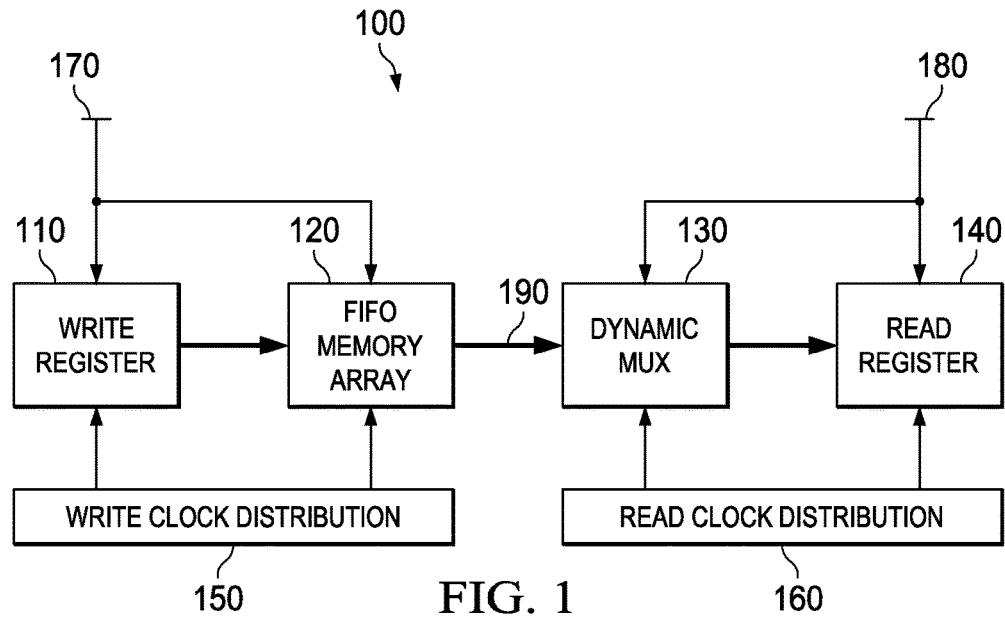
FIG. 1 is a block diagram of one embodiment of an asynchronous FIFO memory.

An implementation of asynchronous FIFO memory generally includes a read frequency and voltage domain (read domain) and a write frequency and voltage domain (write domain). During operation, bits are written to the FIFO memory in the write domain and eventually must transition in both frequency and voltage to the read domain. For example, the FIFO memory is powered and clocked in the write domain. Bits in the FIFO memory are released into a series of multiplexers and registers, making the data available for processing in the read domain. The bits transition from a write voltage domain to a read voltage domain via a level shifter. Level shifters are commonly used to connect digital circuits using one voltage supply level to another digital circuit using another voltage supply level. Any devices between the FIFO memory and the level shifters are powered in the write voltage domain and all devices after the level shifters are powered in the read domain.

As mentioned above, the FIFO memory is clocked in the write domain. The processor or circuit that will read and use the bits stored in the FIFO memory is clocked in the read domain. The read circuit includes data registers, which are also clocked in the read domain. As bits move from the FIFO memory into the registers, they cross from the write frequency domain to the read frequency domain. To avoid metastability, the write and read pointers are typically synchronized. Additionally, programmable clock delays, or "trimmers," can be used to make slight adjustments to the phase of the clock signals to align them for synchronous read and write cycles.

It is realized herein that as a consequence of varying write and read voltage domains, asynchronous FIFO memory implementations can experience large variations in insertion delay between domains. This makes it difficult to meet both setup and hold constraints when transitioning from the write domain to the read domain. It is realized herein that a dynamic multiplexer can serve as the transition device for both the voltage transition and the frequency transition. The FIFO memory can remain entirely in the write domain, powered by a write voltage source, $VDD_{write}$, and clocked by a write clock, $CLK_{write}$. Data flows from the FIFO memory into the dynamic multiplexer as data input in the write domain. The dynamic multiplexer spans both the write and read domains. The dynamic multiplexer is powered by a read voltage source, $VDD_{read}$, and is clocked by a read clock, $CLK_{read}$. The select lines for the dynamic multiplexer are also in the read domain. It is also realized herein the pull-down circuits of the dynamic multiplexer allow it to tolerate a large range of difference between $VDD_{write}$ and $VDD_{read}$ with little variation in multiplexer delay.

Alternatively, it is realized herein, the FIFO memory itself can span both of the voltage domains. Such a dual-domain FIFO memory would distribute the multiplexing function among the cells of the memory array. The transition between the write domain and the read domain is accomplished by implementing read wordlines and addressing logic in the read domain, driven by $VDD_{read}$, while the remaining portions of the FIFO memory are implemented in the write domain, as they are in the conventional FIFO memory.

FIG. 1 is a block diagram of one embodiment of an asynchronous FIFO memory 100. Memory 100 includes a write register 110, a FIFO memory array 120, a dynamic multiplexer, or "mux," 130 and a read register 140. Write register 110 is coupled to FIFO memory array 120 such that bits flowing out of write register 110 are written into the various cells of FIFO memory array 120. Memory 100 also includes a write domain having a write voltage supply 170 that powers write register 110 and FIFO memory array 120, and a write clock distribution 150 that provides a clock signal to write register 110 and FIFO memory array 120.

FIFO memory array 120 is also coupled to dynamic mux 130, which operates to multiplex the data output of FIFO memory array 120 such that it can be later stored in read register 140. Output bits 190 from FIFO memory array 120 flow into dynamic mux 130 as data input, where they are multiplexed and then flow into read register 140. Memory 100 includes a read domain having a read voltage supply 180 that powers dynamic mux 130 and read register 140, and a read clock distribution 160 that provides a clock signal for dynamic mux 130 and read register 140.

During operation of memory 100, output bits 190 flowing into dynamic mux 130 are driven by write voltage supply 170. FIFO memory array 120 remains entirely in the write domain. The output of dynamic mux 130 and the data select lines are both driven by read voltage supply 180. Thus, dynamic mux 130 operates to shift logic levels from the write domain to the read domain. Also, because dynamic mux 130 is clocked in the read domain, it spans both the write and read frequency domains.

Figure 2:
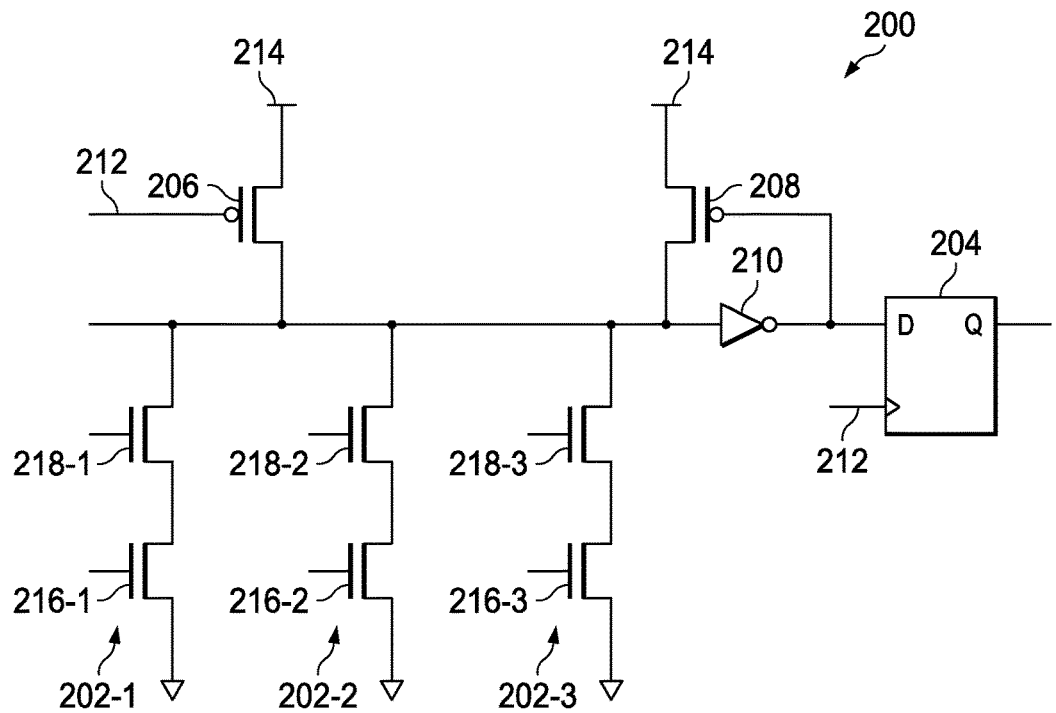
FIG. 2 is a schematic of one embodiment of the dynamic multiplexer for the asynchronous FIFO memory embodiment of FIG. 1.

FIG. 2 is a schematic of one embodiment of a dynamic multiplexer 200, or of the asynchronous FIFO memory embodiment of FIG. 1. Mux 200 includes a series of NMOS pull-down stacks, NMOS pull-down 202-1, NMOS pull-down 202-2 and NMOS pull-down 202-3. These NMOS pull-downs are the avenue by which mux 200 receives data input and data select signals. The embodiment of FIG. 2 includes three NMOS pull-down stacks, indicating it is a 3×1 mux. Alternate embodiments can have any number of data inputs depending on the demand of the application. For example, a 24×1 mux would have 24 NMOS pull-down stacks, and a 256×1 mux would have 256.

The gates of each of the NMOS pull-down stacks are driven by a data select signal and a data input signal. Data input signals are ideally driven concurrently, while data select signals are driven monotonically. In other words, data can arrive at each channel of mux 200 at any time, but only one channel is selected per cycle and the data on that channel needs to be stable when selected. In the embodiment of FIG. 2, NMOS pull-down 202-1 has one gate driven by a data input 216-1, and a second gate driven by a data select 218-1. Likewise, NMOS pull-down 202-2 is driven by a data input 216-2 and a data select 218-2, and NMOS pull-down 202-3 is driven by a data input 216-3 and a data select 218-3.

Mux 200 includes a pre-charge pull-up 206. Pre-charge pull-up 206 is a PMOS transistor having a source powered by a read voltage source 214, and a gate driven by a pre-charge signal 212. On a falling edge of pre-charge signal 212, the dynamic node of mux 200 is charged up to the level of read voltage source 214.

Mux 200 also includes a dynamic-to-static converter, or "glitch latch," 204 that is clocked by pre-charge signal 212. On a rising edge of pre-charge signal 212, glitch latch 204 becomes transparent and latches the bit value if the dynamic node discharges. To aid in latching the appropriate value, mux 200 further includes a keeper circuit having an inverter 210 coupled to the dynamic node and a PMOS transistor 208. PMOS transistor 208 has a source powered by read voltage source 214, a gate driven by an inverted feedback, and a drain coupled to the dynamic node. The keeper circuit operates to strengthen logic level high signals and provides noise immunity.

Mux 200 operates to multiplex several data input signals in the write domain into an output signal driven in the read domain. For example, data input 216-1 is driven by a write voltage source. When that channel of mux 200 is selected, data select 218-1 is driven high. If data input 216-1 is logic low, the dynamic node remains at the pre-charge level. If data input 216-1 is logic high, that NMOS transistor closes and the dynamic node is pulled down to ground via NMOS pull-down 202-1. Inverter 210 inverts the value at the dynamic node, which is then latched by glitch latch 204.

Figure 3:
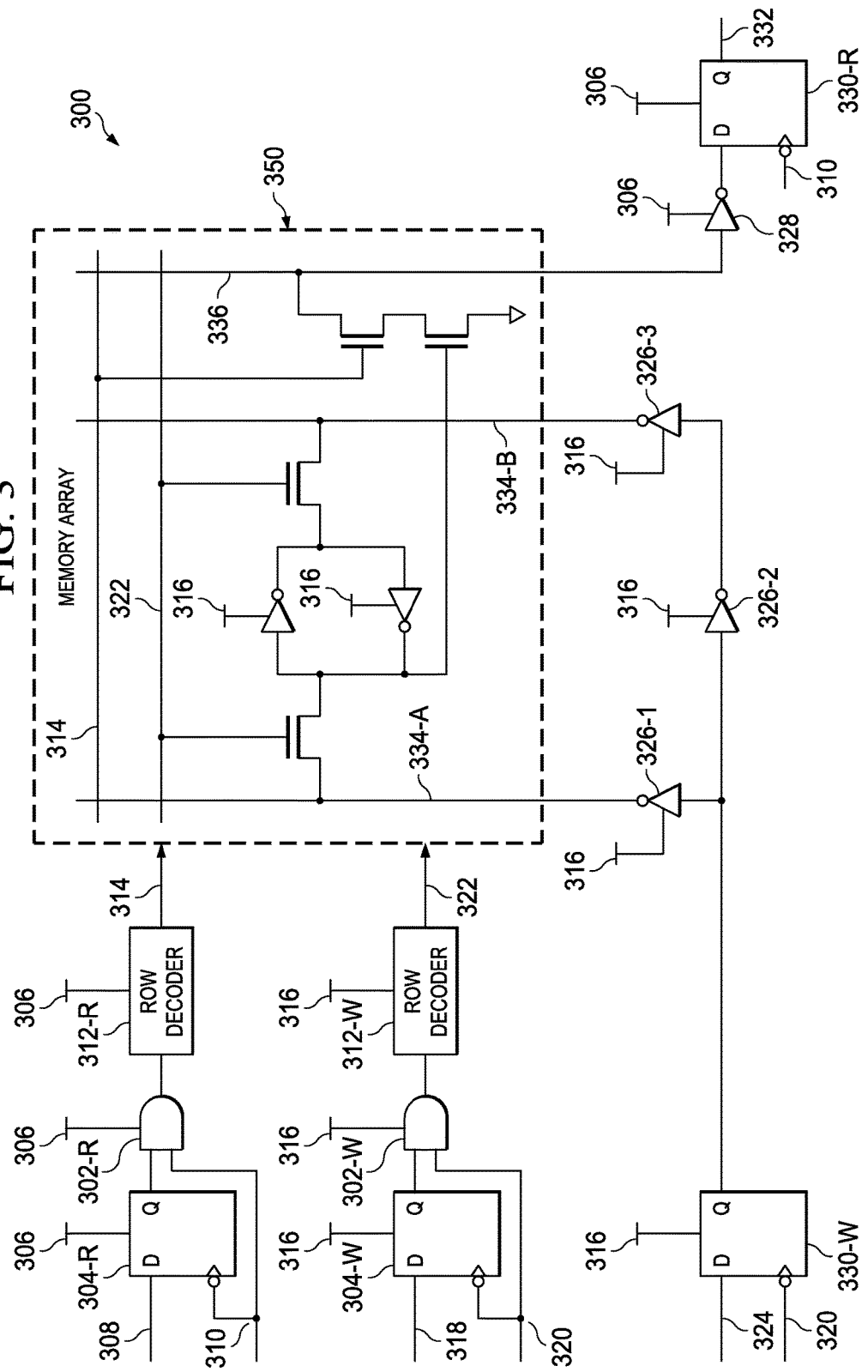
FIG. 3 is a schematic of one embodiment of a multi-domain FIFO memory.

FIG. 3 is a schematic of one embodiment of a multi-domain FIFO memory 300. Memory 300 includes a memory array 350 made up of eight-transistor (8T) cells having one read port and one write port, one of which is illustrated in FIG. 3. The cross-coupled inverters that comprise the cell are powered by a write voltage supply 316. Memory array 350 includes a read wordline (RWL) 314, a write wordline (WWL) 322, a read bitline (RBL) 336, and a complimentary pair of write bitlines: a write bitline A (WBL) 334-A and a write bitline B (WBLB) 334-B.

Memory 300 includes a read addressing circuit and a write addressing circuit. The read addressing circuit is powered by a read voltage supply 306 and drives read wordline 314. The read addressing circuit includes a read latch 304-R that is driven by a read address signal 308 and clocked by a read clock 310. The output of read latch 304-R passes through a read AND gate 302-R along with read clock 310. The product of read AND gate 302-R drives a read row decoder 312-R, which, in turn, drives read wordline 314. Read AND gate 302-R and read row decoder 312-R are both powered by read voltage supply 306.

Similarly, the write addressing circuit is powered by write voltage supply 316 and drives write wordline 322. The write addressing circuit includes a write latch 304-W that is driven by a write address signal 318 and clocked by a write clock 320. The output of write latch 304-W passes through a write AND gate 302-W along with write clock 320. The product of write AND gate 302-W drives a write row decoder 312-W, which, in turn, drives write wordline 322. Write AND gate 302-W and write row decoder 312-W are both powered by write voltage supply 316.

During write operation, assuming the appropriate addressing, the illustrated 8T cell of memory array 350 is coupled to write bitlines WBL 334-A and WBLB 334-B. Memory 300 includes a data write latch 330-W that latches the data input from write data signal 324 upon a falling edge of write clock 320. Data write latch 330-W is powered by write voltage supply 316. The data input, or data output of data write latch 330-W, passes through several inverters, also powered by write voltage supply 316. WBL 334-A is driven by the data input via an inverter 326-1. WBLB 334-B is driven by the data input via inverters 326-2 and 326-3. The illustrated 8T cell of memory array 350 stores the data input according to the charges applied to WBL 334-A and WBLB 334-B.

During read operation, assuming the appropriate addressing, the illustrated 8T cell of memory array 350 is coupled to read bitline 336. Memory 300 includes a data read latch 330-R powered by read voltage supply 306 and clocked by read clock 310. The bit value stored in the 8T cell is applied to read bitline 336 and passes through an inverter 328 that is powered by read voltage supply 306. The inverted data output of memory array 350 is latched by data read latch 330-R and available on an output line 332.

Figure 4:
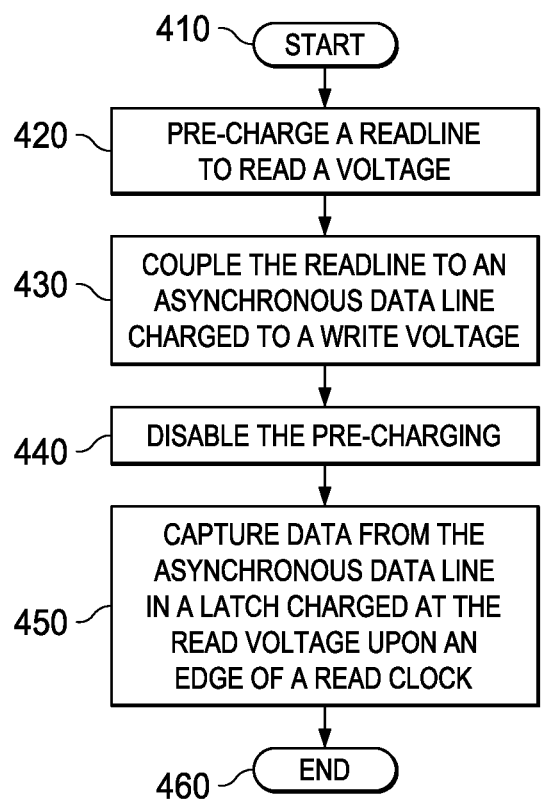
FIG. 4 is a flow diagram of one embodiment of a method of transitioning between two asynchronous voltage-frequency domains.

FIG. 4 is a flow diagram of one embodiment of a method of transitioning between two voltage-frequency domains. The method begins at a start step 410. At a pre-charge step 420, a readline is charged to a read logic high level. Through an NMOS pull-down, the readline is coupled to an asynchronous data input line driven at a write logic level at a pull-down step 430. In certain embodiments, the pull-down is enabled by read logic level data select signal. If the asynchronous data input line is logic high, the pull-down activates, pulling the readline to ground. If the asynchronous data input line is held at its pre-charge level, read logic high. At a step 440, the pre-charging is disabled. At a step 450, the data value from the asynchronous data input is latched in a glitch latch powered at the read logic level. The glitch latch is clocked by a read clock. The asynchronous data input is in a write domain and the latched data in the glitch latch is in the read domain. The method then ends at an end step 460.

Those skilled in the art to which this application relates will appreciate that other and further additions, deletions, substitutions and modifications may be made to the described embodiments.

What is claimed is:

1. A dual-domain memory spanning a write domain and a read domain, comprising:
   a static random access memory (SRAM) cell having a storage node by which values are writable and readable;
   a write word line electrically couplable to a write voltage source of said write domain and operable to cause said SRAM cell to latch a value applied to a write bit line electrically coupled to said storage node;
   a read word line electrically couplable to a read voltage source of said read domain and operable to cause said SRAM cell to apply a latched value to a read bit line for use in additional circuitry in said read domain, wherein said read voltage source is different than said write voltage source; and
   a dynamic multiplexer, said dynamic multiplexer comprising:
      said write domain having a write clock and said read domain having a read clock;
      a plurality of data and data select input pairs wherein a data input of an input pair of said plurality of data and data select input pairs refers to said latched value to said read bit line in said write domain and a data select input of said input pair is in said read domain; and
      a pre-charge stage in said read domain that is energized upon an edge of said read clock, whereby one data and data select input pair is enabled and data latched in said read domain upon another edge of said read clock.

2. The dual-domain memory recited in claim 1 wherein said SRAM cell is an eight-transistor (8T) SRAM cell.

3. The dual-domain memory recited in claim 1 further comprising a negated read bit line comparable to said read bit line to allow for differential sensing of said latched value.

4. The dual-domain memory recited in claim 1 further comprising address decoders in said read domain, electrically coupled to said read voltage source and operable to couple said read word line to said read voltage source according to an address signal.

5. The dual-domain memory recited in claim 1 wherein said write domain and said read domain are asynchronous.

6. The dual-domain memory recited in claim 1 further comprising a sense amplifier coupled to said read bit line and operable to detect and regenerate said latched value for use in additional circuitry in said read domain.

\* \* \* \* \*

UNITED STATES PATENT AND TRADEMARK OFFICE
CERTIFICATE OF CORRECTION

PATENT NO. : 10,234,893 B2
APPLICATION NO. : 13/892931
DATED : March 19, 2019
INVENTOR(S) : Guillermo J. Rozas, Jason Golbus and Chi Keung Lee Page 1 of 1

It is certified that error appears in the above-identified patent and that said Letters Patent is hereby corrected as shown below:

In the Specification

In Column 3, Line 57, after --multiplexer 200, or-- insert --"mux,"--

Signed and Sealed this
Twenty-first Day of May, 2019

Andrei Iancu
*Director of the United States Patent and Trademark Office*